United States Patent
Blume

(10) Patent No.: US 6,422,113 B1
(45) Date of Patent: Jul. 23, 2002

(54) KNIFE DRUM FOR MACHINES FOR CROSS-CUTTING LINES OF MATERIAL

(75) Inventor: Albrecht Blume, Düsseldorf (DE)

(73) Assignee: Jagenberg Papiertechnik GmbH, Neuss (DE)

( * ) Notice: Subject to any disclaimer, the term of this patent is extended or adjusted under 35 U.S.C. 154(b) by 0 days.

(21) Appl. No.: 09/424,946

(22) PCT Filed: Mar. 6, 1998

(86) PCT No.: PCT/EP98/01321

§ 371 (c)(1),
(2), (4) Date: Dec. 3, 1999

(87) PCT Pub. No.: WO98/55276

PCT Pub. Date: Dec. 10, 1998

(30) Foreign Application Priority Data

Jun. 5, 1997 (DE) .......................................... 19723513

(51) Int. Cl.$^7$ ............................ B26D 1/00; B26D 7/26; B23P 15/40
(52) U.S. Cl. ........................................ 83/342; 83/672
(58) Field of Search .............................. 83/672, 698.41, 83/698.42, 663, 342, 343, 345; 492/45, 50, 51, 55

(56) References Cited

U.S. PATENT DOCUMENTS

| | | | | |
|---|---|---|---|---|
| 1,306,009 A | * | 6/1919 | Hartman ...................... | 83/345 |
| 3,543,622 A | * | 12/1970 | Rice ............................ | 83/342 |
| 3,822,625 A | * | 7/1974 | Obenshain ................... | 83/342 |
| 4,005,627 A | | 2/1977 | Craddy | |
| 4,094,219 A | * | 6/1978 | Fabian et al. ................. | 83/345 |
| 4,130,451 A | * | 12/1978 | Hamilton et al. ............. | 156/86 |
| 4,385,952 A | * | 5/1983 | Futakuchi et al. ........... | 428/114 |
| 4,586,224 A | * | 5/1986 | Sartor et al. .................. | 492/31 |
| 4,622,086 A | * | 11/1986 | Puck et al. .................. | 156/166 |
| 4,963,210 A | * | 10/1990 | Corr et al. ................... | 156/172 |
| 5,061,533 A | * | 10/1991 | Gomi et al. ................ | 428/36.3 |
| 5,383,062 A | * | 1/1995 | Sato et al. ................... | 359/894 |
| 5,493,940 A | * | 2/1996 | Klein ........................... | 83/343 |
| 6,065,382 A | * | 5/2000 | Titz et al. ..................... | 83/341 |
| 6,155,151 A | * | 12/2000 | Reichert ...................... | 83/342 |

FOREIGN PATENT DOCUMENTS

| | | |
|---|---|---|
| DE | 35 31 786 A1 | 3/1987 |
| DE | 38 31 393 A1 | 3/1990 |
| DE | G 92 04 618 | 7/1992 |
| DE | 42 23 566 A1 | 1/1994 |
| DE | 4321163 C2 * | 12/1994 |
| EP | 0 630 724 A1 | 12/1994 |
| JP | 61194197 | 8/1986 |

\* cited by examiner

*Primary Examiner*—Kenneth E. Peterson
*Assistant Examiner*—Stephen Choi
(74) *Attorney, Agent, or Firm*—Herbert Dubno

(57) ABSTRACT

A knife drum for a web cross-cutting machine has a generally cylindrical drum body centered on an axis and formed by inner and outer tubes. The inner tube is reinforced with fibers extending helicoidally of the axis at positive and negative angles of 30° to 60° crosswise of one another. The outer tube is fitted coaxially in direct engagement over the inner tube and is reinforced with fibers extending at an angle of less than 30° to the axis. It further is formed with a full-length radially outwardly open groove holding a blade holder in turn carrying a blade.

11 Claims, 5 Drawing Sheets

KNIFE DRUM FOR MACHINES FOR CROSS-CUTTING LINES OF MATERIAL

CROSS REFERENCE TO RELATED APPLICATIONS

This application is the US national phase of PCT application PCT/EP98/01321 filed Mar. 6, 1998 with a claim to the priority of German application 197 23 513.1 filed Jun. 5, 1997.

FIELD OF THE INVENTION

The invention relates to a knife drum for machines for cross-cutting webs, in particular paper or cardboard webs, having a generally cylindrical support body of a fiber-reinforced material on whose surface is secured at least one holder for a blade extending the length of the drum.

BACKGROUND OF THE INVENTION

Cross-cutting machines for producing sheets of paper or cardboard have as is known two knife drums rotatably supported one above the other in a machine frame and having blades that engage each other for cutting in order to transversely cut through the continuous web. In order that paper or cardboard webs of considerable width can be cut with high accuracy and at high production speeds, the knife drums must meet numerous requirements:

The maximum resistance to torsional and bending deformation must be achieved with minimal mass. The knife drum must have the highest possible self damping and must be resistant to mechanical and chemical damage. In order to cut thick paper or cardboard webs it is necessary to conduct considerable cutting forces over large surfaces via the blade into the surface of the knife drum without there being any unacceptable radial deformations in the region where the blades are secured.

German patent 4,321,163 describes a knife drum of this type with a cylindrical drum body that is formed of a plastic tube that is made of carbon-fiber reinforced epoxy resin. A metallic blade holder is fixed on the plastic tube. The carbon fibers are imbedded as a continuous helix in the body of the plastic tube. carbon-fiber reinforced plastic segments are set between the blade holders with their carbon fibers extending generally parallel to the rotation axis of the plastic tube.

OBJECT OF THE INVENTION

It is an object of the invention to produce a blade drum that has improved resistance to bending and torsional stresses relative to its volume.

SUMMARY OF THE INVENTION

This object is achieved according to the invention in that the support body is formed of two concentrically interfitted tubes of fiber-reinforced material, that the fibers of the inner tube are wound across one another at positive and negative angles of 30° to 60°, preferably 45°, to the rotation axis of the support body, that the fibers of the outer tube are wound at a positive and/or negative angle of less than 30°, preferably less that 10°, to the rotation axis of the support body, and that the blade holder is fixed in a groove extending the full length of the drum and cut into the outer surface of the outer tube by a chip-removing procedure, in particular by milling.

The blade drum according to the invention has two separate layers of which the inner layer is substantially responsible for torsional stiffness and the outer layer is substantially responsible for bending stiffness. Both layers are made of a fiber-reinforced material whose fibers are imbedded in the body.

BRIEF DESCRIPTION OF THE DRAWING

The drawing serves to describe the invention with respect to a simplified illustrated embodiment wherein FIG. 1 schematically shows a section transverse to the web-travel direction through a cross-cutting machine;

FIGS. 3 to 8 show further embodiments of a knife drum according to the invention.

SPECIFIC DESCRIPTION

Figure 1:
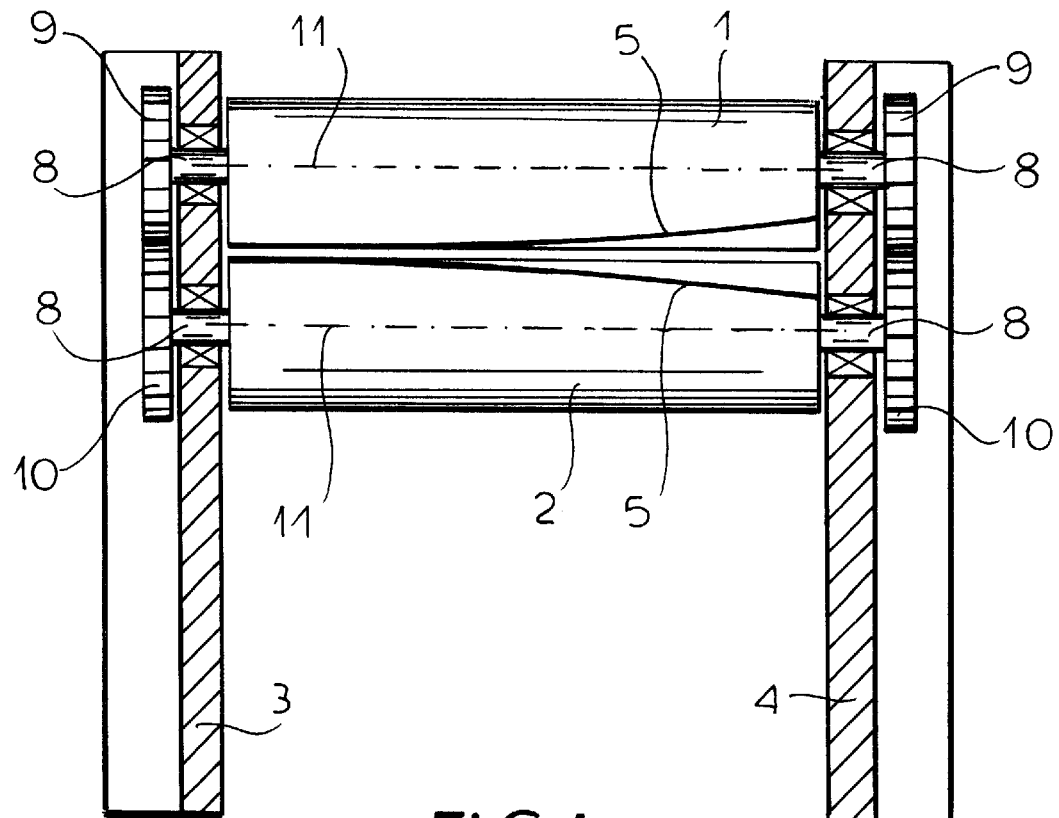

The cross-cutting machine has two knife drums 1 and 2, which are rotatably supported at their axial ends in side parts 3 and 4 of the machine frame. The two knife drums 1 and 2 are positioned one over the other with horizontal rotation axes 11 and each carry at least one blade 5 extending the full drum length and secured in a holder 6. The holder 6 is secured on the outer surface in a groove 7 that extends helicoidally. Each blade 5 is clamped to follow a curve in its groove 7 so that the web when running through can be cut perpendicularly. So that the two knife drums 1 and 2 rotate at the same speed, synchronizing gears 9 and 10 are provided on the ends of pins 8 extending through their bearings.

The two knife drums (upper drum 1 and lower drum 2) are essentially identical as far as the invention is concerned and provided with the same number of blades 5. The construction of different embodiments is described in more detail in FIGS. 2 to 8:

Each drum 1 or 2 is comprised of a cylindrical support body on whose ends are fixed the pivot pins 8 for rotatably mounting in the machine frame coaxial to the respective rotation axis 11. The support body is formed of two tubular concentrically interfitted tubes 12 and 13 that are made of a fiber-reinforced material, preferably a composite of carbon fibers and resin (CFK fiber composite). The inner tube 12 is constructed such that it ensures the required torsional stiffness. To this end the carbon fibers of the inner tube are wound both at positive and negative angles of from 30° to 60°, preferably 45°, to the rotation axis 11.

The outer tube 13 is set up such that it ensures the required bending stiffness. To this end the carbon fibers in the outer tube are wound at a positive and/or negative angle of less than 30°, preferably less than 10°, 5° to 8° in the example, relative to the rotation axis 11. In this system the slight angle ideal for bending stiffness is achieved by winding on the carbon fibers in layers. The winding of the carbon fibers of the inner tube 12 is mainly crosswise, that is they are wound at both positive and negative angles. At very small angles close to 0° it is also possible to wind in only one direction.

The wall thickness of the inner tube 12 is at least as great as the wall thickness of the outer tube, preferably 1.1 to 3 times the wall thickness of the outer tube 13. If the fibers of the inner tube 12 have the same modulus of elasticity as the fibers of the outer tube 13, it is advantageous to make the inner tube 12 about twice as thick as the outer tube 13. In the embodiment the inner tube has an inside diameter of 110 mm and a wall thickness of 40 mm, the outer tube 13 a wall thickness of 20 mm.

A groove 7 is cut into the surface of the outer tube 13 by a chip-removing process, in particular by milling, and runs in a helix along the length of the drum. The depth of the grooves 7 is such that each groove 7 is exclusively in the outer tube 13, no material being cut during milling of the groove 7 out of the inner tube 12. Secured in at least one groove 7 is a blade holder 6 made of metal, preferably of steel, running helically along the groove 7, and having elements for clamping a blade 5 and positioning its edge. The mounting of the blade 5 in the upper drum 1 and in the lower drum 2 is shown in more detail in FIG. 3.

The blade holder 6 is glued into the groove 7 of the outer tube 13. It has a planar outer face extending at a flat positive angle to a tangent of the support body and serving as support surface for the blade 5. The blade 5 is bolted in place on the holder 6 with a radially projecting cutting edge by means of mounting screws 14 that are axially spaced on 50 mm centers. In addition the upper knife drum 1 has about every 50 mm along its length adjustment screws 15 threaded into the blade holder and bearing against the rear edge of the blade 5. The adjustment screws 15 ensure the exact adjustment of the angular position of the cutting edge of the blade 5.

Figure 2:
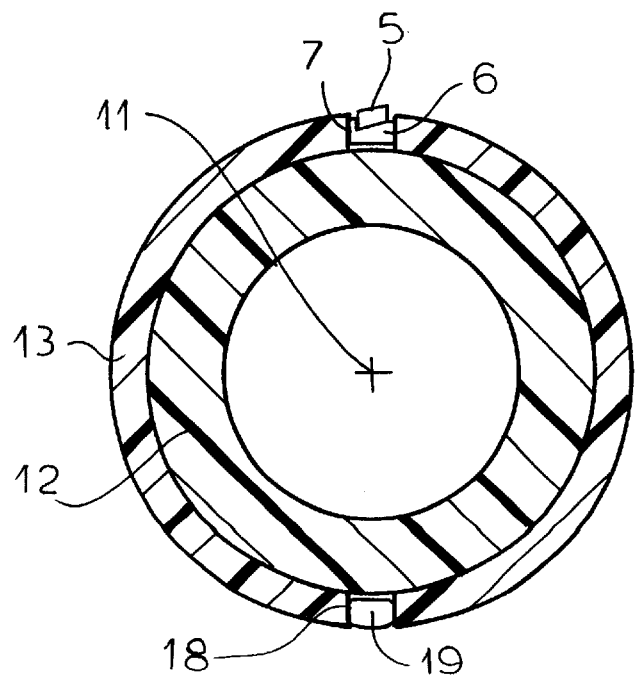
FIG. 2 is a cross section through a knife drum.
Figure 3:
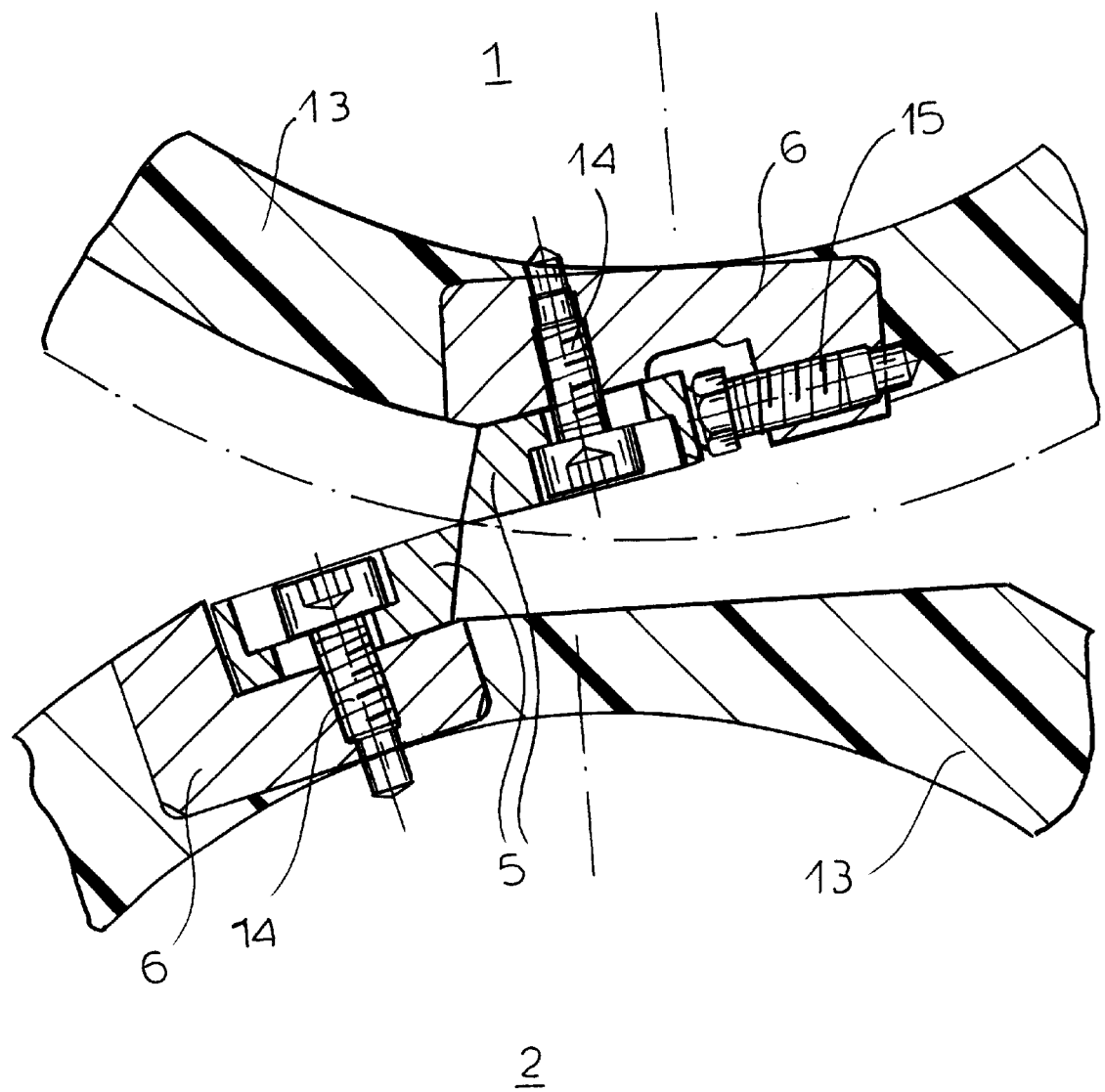
FIG. 3 shows in cross section the relative orientation of the upper knife drum to the lower knife drum and the attachment of the knives.

In the embodiment according to FIG. 2 a second groove 18 is cut into the outer surface of the outer drum 13 of the knife drum offset 180° from the groove 7. The second groove 18 extends over the surface directly opposite the knife groove 7, also as a helicoid. Secured in the groove 18 is a counterweight 19 that is constructed such that the center of mass of the knife drum lies on the axis 11.

Figure 4:
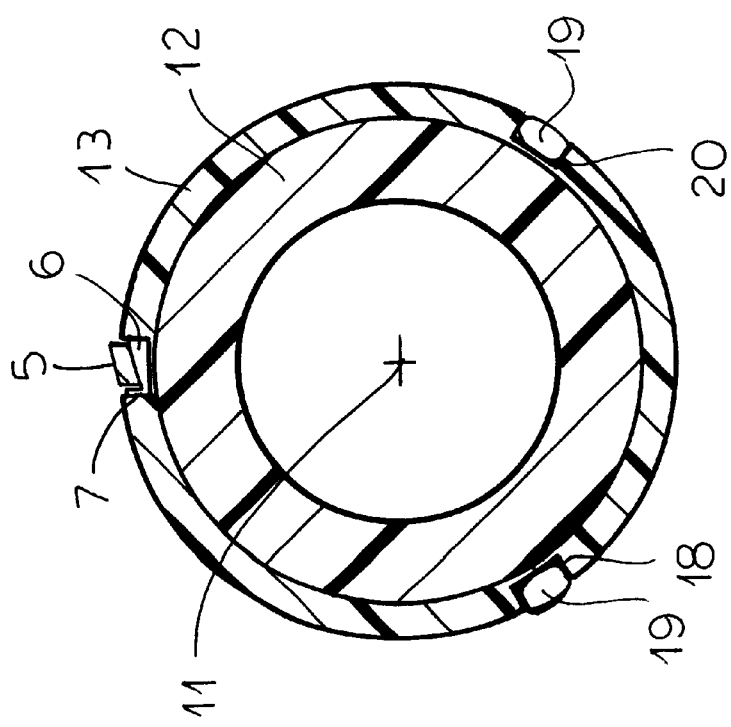

FIG. 4 shows a further embodiment of a knife drum according to the invention wherein three angularly equidistant grooves 7, 5 18, and 20 spaced at 120° are machined into the surface of the outer tube 13. One groove 7 holds a blade holder 6 with a blade 5, and the two other grooves 18 and 20 each hold a counterweight 19. The counterweights 19 are constructed such that not only does the center of mass of the knife drum lie on the rotation axis 11, but also the two main surface components of inertia are about the same. This knife drum is particularly useful in high-speed cross-cutting machines.

Figure 5:
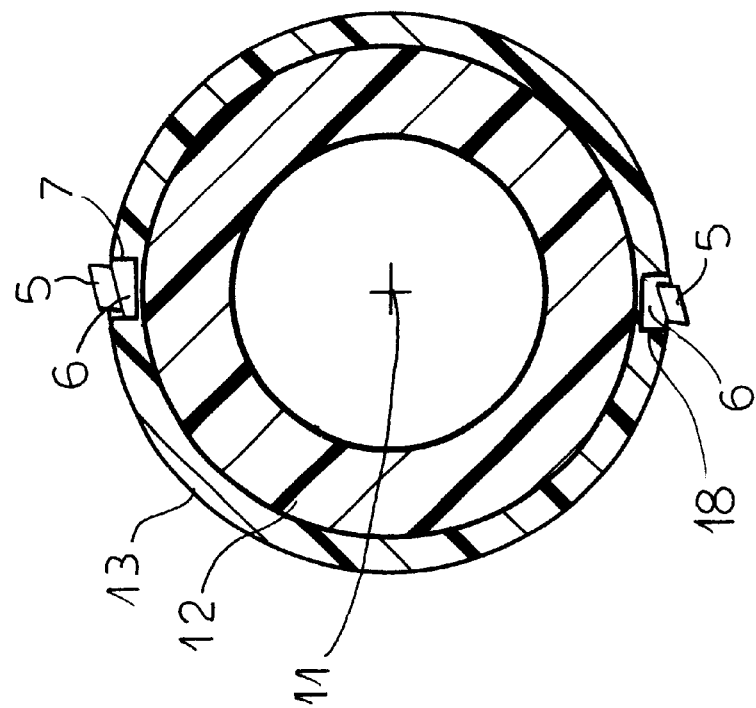
Figure 7:
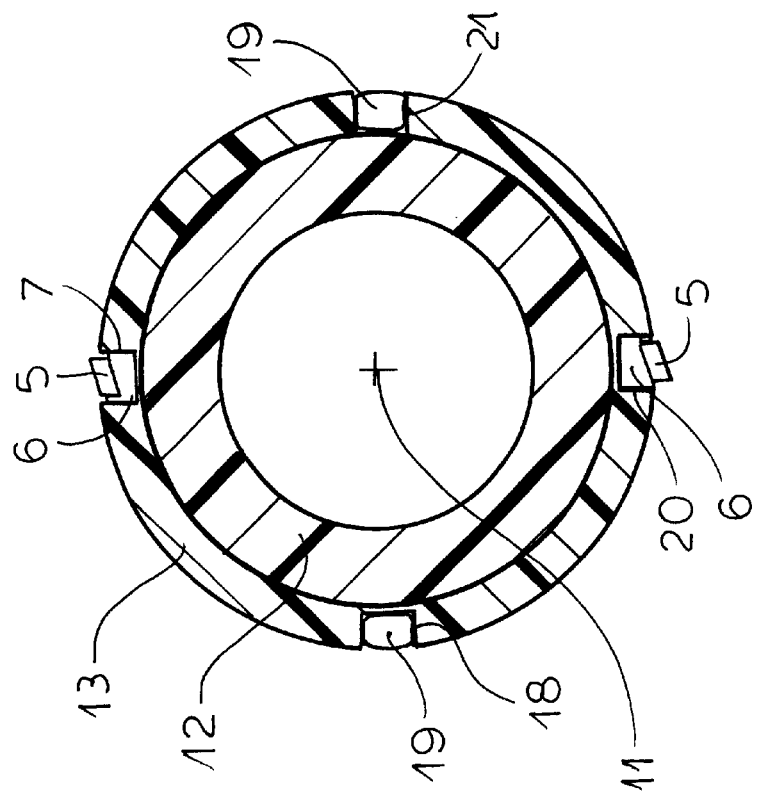
Figure 6:
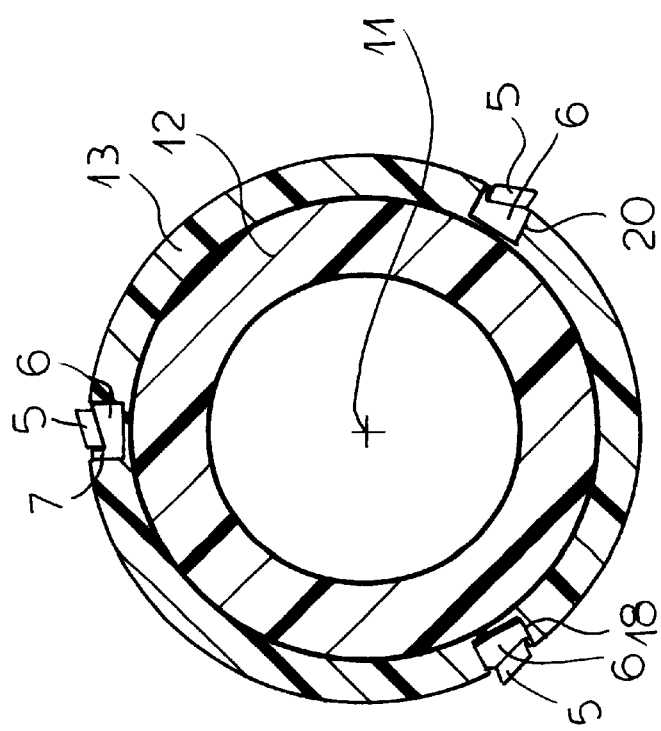

The knife drums according to FIGS. 5, 6, and 7 each have more than one blade 5. They are set up in particular to cut short formats so that on one revolution two (FIGS. 5 and 7) or three (FIG. 6) cuts are made.

In the embodiment according to FIG. 5 there are two grooves 7 and 18 at a spacing of 180° and cut diametrally opposite as helicoids in the outer surface of the outer tube 13. Each groove 7 and 18 holds a respective blade holder 6 with a blade 5.

FIG. 6 shows an embodiment with three grooves 7, 18, and 20 that are distributed angularly at a spacing of 120°. Fixed in each groove 7, 18, and 20 is a blade holder with a blade 5. Since on one revolution of the knife drum there are three cuts, such a knife drum can work with a high cut rate.

The knife drum according to FIG. 7 has four grooves 7, 18, 20, and 21 with opposite grooves 7 and 20 each holding a blade holder 6 with a blade 5 and the two other grooves 18 and 21 offset by about 90° each holding a counterweight 19. This knife drum is also set up for high cut rates, since there are two cuts per revolution and at the same time as a result of the counterweights the surface moments of inertia are distributed uniformly over the circumference.

Figure 8:
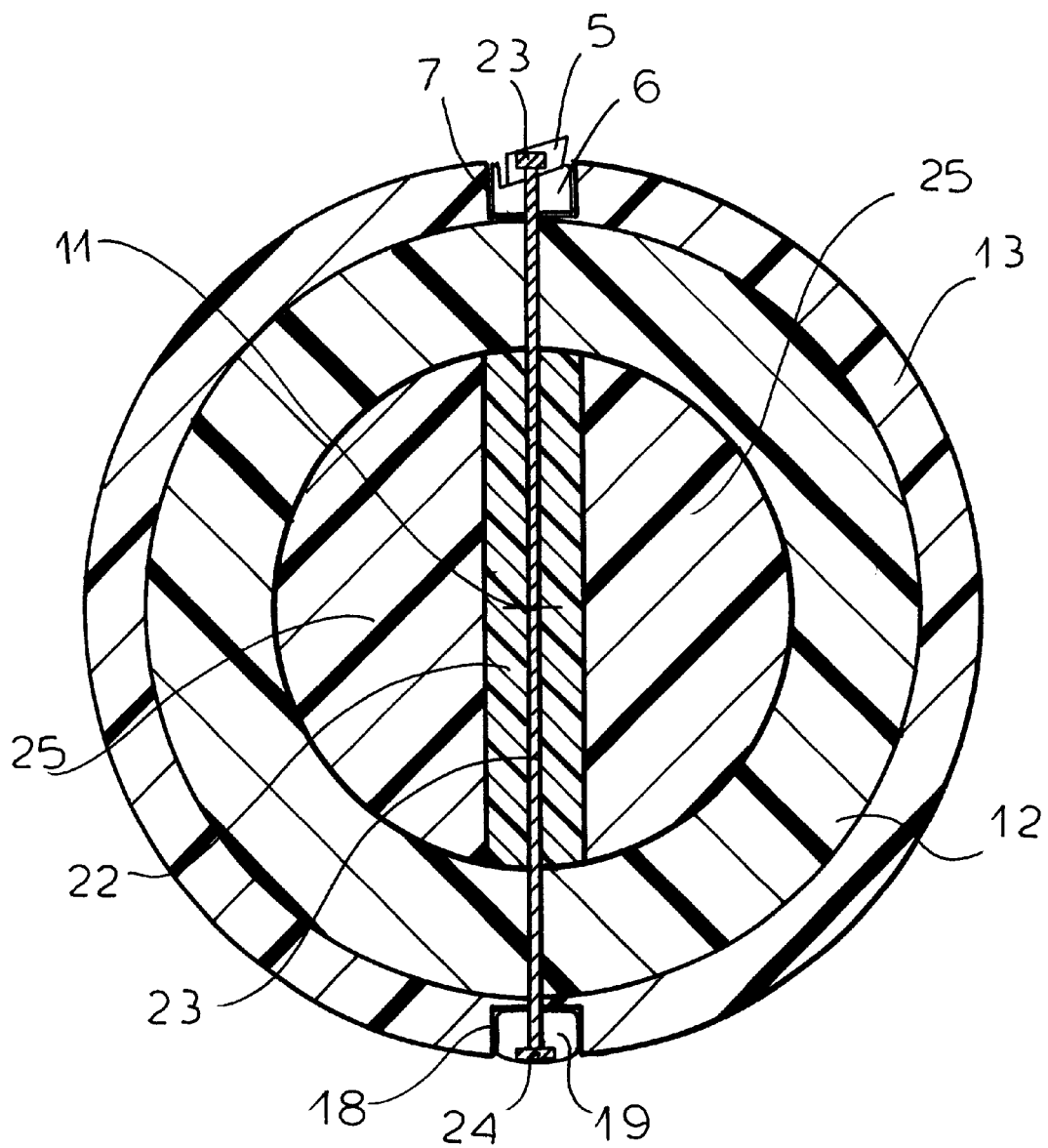

FIG. 8 shows a knife drum having a bar-shaped brace element 22 extending axially the full length of the drum and radially over the inside diameter of the inner tube 22. The reinforcement element 22 serves to prevent the knife drum from deforming radially with high cutting forces. The brace element 22 thus extends radially of the knife 5 through the rotation axis. In addition as in FIG. 2 this embodiment has in addition to the knife groove 7 a second groove 18 offset by about 180° and holding a counterweight 19. The blade 5 is secured in the groove 7 by means of a row of tension screws 23 which extend through the knife drum and the brace element 22 into respective threaded bores in the counterweight 19 or nuts 24 bearing thereon. The tension screws 23 prevent the blade holder 5, and or the counterweight 19 from coming loose as a result of vibration during use the blade 5.

Preferably the bar-shaped brace element 22 is also made of fiber-reinforced material that is produced by winding around a plate-shaped winding core with radially extending fibers. The radially extending fibers of the brace element 22 withstand the compressive forces produced during cutting in the blade holder 6 without any radial deformation of the knife drum.

The knife drum according to FIG. 8 can advantageously be made such that the brace element 22 is part of the winding core on which the fibers of the inner tube 12 are wound. Thus first the brace element 22 is made and then fitted with segments of a light material that is stiff and strong enough to function as a winding core. Preferably the segments 25 are made of a foamed plastic. They are subsequently machined with the blade element 22 to a perfectly cylindrical winding core. Then the inner tube 12 is produced by layered winding with resin-soaked carbon fibers so that the segments 25 remain with the brace element 22 like a type of lost mold. Finally the outer tube 13 is installed, the grooves 7 and 18 are machined in the outer surface, and the throughgoing holes for the tension screws 23 are drilled.

What is claimed is:

1. A knife drum for a web cross-cutting machine, the drum comprising:
    a generally cylindrical drum body centered on an axis and formed by
        an inner annularly continuous tube reinforced with fibers extending helicoidally of the axis at positive and negative angles of 30° to 60° crosswise of one another and
        an outer annularly continuous tube fitted coaxially in direct engagement over the inner tube and reinforced with fibers extending at an angle of less than 30° to the axis, the outer tube being formed with a generally axially extending, radially outwardly open, and radially inwardly closed helicoidal groove;
    a helicoidal blade holder fixed in the groove; and
    a helicoidal blade secured in the blade holder.

2. The knife drum defined in claim 1 wherein the inner-tube fibers extend at an angle of about 45° to the axis.

3. The knife drum defined in claim 1 wherein the outer-tube fibers extend at an angle of less than 10° to the axis.

4. The knife drum defined in claim 1 wherein the inner tube has a radical wall thickness that is greater than a radial wall thickness of the outer tube.

5. The knife drum defined in claim 1 wherein the inner tube has a radial wall thickness equal to between 1.1 and 3 times a radial wall thickness of the outer tube.

6. The knife drum defined in claim 1 wherein the outer tube is formed with a second such helicoidal and inwardly closed groove diametrally opposite the first-mentioned groove, the drum further comprising
    structure in the second groove of generally the same weight as the holder and blade in the first groove.

7. The knife drum defined in claim 1 wherein the outer tube is formed with second and third such grooves angularly equispaced with the first-mentioned groove, the drum further comprising respective counterweights in the second and third grooves.

8. The knife drum defined in claim 1 wherein the outer tube is formed with second, third, and fourth such grooves angularly equispaced with the first-mentioned groove with the third groove lying diametrally opposite the first groove, the drum further comprising a second such helicoidal blade holder and blade in the third groove; and respective helicoidal counterweights in the second and fourth grooves.

9. The knife drum defined in claim 1 further comprising an axially elongated and diametrally extending brace element inside the inner tube and extending diametrally across the inner tube in radial line with the blade.

10. The knife drum defined in claim 9 wherein the brace element has a plate-shaped core and reinforcement fibers wound around the core and extending radially of the axis.

11. The knife drum defined in claim 1, further comprising tension screws extending diametrally through the drum and brace element and each having one end seated in the blade holder and an opposite end seated in an opposite side of the drum.

* * * * *